(12) United States Patent
Lanzilotta et al.

(10) Patent No.: US 8,437,911 B2
(45) Date of Patent: May 7, 2013

(54) RIDE HEIGHT CONTROL SYSTEM AND METHOD FOR CONTROLLING LOAD DISTRIBUTION AT TARGET RIDE HEIGHT IN A VEHICLE SUSPENSION SYSTEM

(75) Inventors: Edward Lanzilotta, Reading, MA (US); Damian Harty, Coventry (GB); William T. Larkins, Manchester, NH (US)

(73) Assignee: Fourth Floor Associates, Inc., Manchester, NH (US)

( * ) Notice: Subject to any disclaimer, the term of this patent is extended or adjusted under 35 U.S.C. 154(b) by 439 days.

(21) Appl. No.: 12/858,226

(22) Filed: Aug. 17, 2010

(65) Prior Publication Data

US 2012/0046828 A1 Feb. 23, 2012

(51) Int. Cl.
*B60G 17/018* (2006.01)
*B60G 23/00* (2006.01)
*B60C 3/00* (2006.01)
*B62K 25/00* (2006.01)
*G06F 7/00* (2006.01)
*G06F 17/00* (2006.01)
*G06F 19/00* (2011.01)

(52) U.S. Cl.
USPC .......................................................... 701/37

(58) Field of Classification Search .................. None
See application file for complete search history.

(56) References Cited

U.S. PATENT DOCUMENTS

| 4,468,050 A | 8/1984 | Woods et al. |
| 5,037,119 A | 8/1991 | Takehara et al. |
| 5,060,959 A | 10/1991 | Davis et al. |
| 5,342,079 A * | 8/1994 | Buma ...................... 280/5.513 |
| 5,452,919 A | 9/1995 | Hoyle et al. |
| 5,483,448 A | 1/1996 | Liubakka et al. |
| 5,624,105 A | 4/1997 | Runkel |
| 6,173,974 B1 | 1/2001 | Raad et al. |
| 6,234,493 B1 | 5/2001 | Kleen et al. |
| 6,260,860 B1 | 7/2001 | Brookes et al. |
| 6,264,213 B1 | 7/2001 | Kutscher |
| 6,369,583 B1 | 4/2002 | Sommer et al. |
| 6,389,341 B1 | 5/2002 | Davis |
| 6,575,484 B2 | 6/2003 | Rogala et al. |
| 6,648,309 B2 | 11/2003 | Beck |
| 6,669,216 B1 | 12/2003 | Elser et al. |
| 6,834,736 B2 | 12/2004 | Kramer et al. |

(Continued)

OTHER PUBLICATIONS

International Search Report and Written Opinion Report dated Apr. 9, 2012 issued in PCT Patent Application No. PCT/US2011/047321, 12 pages.

(Continued)

*Primary Examiner* — Paul Danneman
(74) *Attorney, Agent, or Firm* — Grossman Tucker Perreault & Pfleger PLLC

(57) ABSTRACT

A ride height control system and method may be used to control load distribution at wheel locations in a vehicle suspension system at target ride height. Load distribution may be controlled by adjusting the forces applied by the suspension system at respective wheel locations while maintaining a target ride height. In an exemplary air spring suspension system or hydropneumatic suspension system, the applied forces may be adjusted by adjusting the pressure in the suspension system at the respective wheel locations. The ride height control system and method may determine and establish balanced target ride height forces (e.g., planar forces) to be applied at the wheel locations of the vehicle to prevent a cross-jacking condition.

19 Claims, 3 Drawing Sheets

U.S. PATENT DOCUMENTS

| | | |
|---|---|---|
| 6,904,344 B2 | 6/2005 | LaPlante et al. |
| 6,994,136 B2 | 2/2006 | Stanczak |
| 7,104,547 B2 | 9/2006 | Brookes et al. |
| 7,261,304 B2 | 8/2007 | Trudeau et al. |
| 7,299,112 B2 | 11/2007 | LaPlante et al. |
| 7,357,397 B2 | 4/2008 | Brookes et al. |
| 7,370,849 B2 | 5/2008 | Beck |
| 7,441,782 B2 | 10/2008 | Stiller |
| 7,497,452 B2 | 3/2009 | Schedgick |
| 7,607,667 B2 | 10/2009 | Brookes et al. |
| 7,624,994 B2 | 12/2009 | Stegmann |
| 2005/0284716 A1 | 12/2005 | Ammon et al. |
| 2006/0142916 A1 | 6/2006 | Onuma et al. |
| 2008/0021611 A1 | 1/2008 | Hiebert et al. |
| 2009/0216403 A1 | 8/2009 | Holbrook |

OTHER PUBLICATIONS

International Search Report and Written Opinion dated Jan. 6, 2012 issued in PCT Patent Application No. PCT/US2011/047334, 10 pages.

U.S. Office Action dated Jan. 9, 2013 issued in U.S. Appl. No. 12/858,197, 23 pages.

International Preliminary Report on Patentability issued Feb. 28, 2013 in PCT Patent Application No. PCT/US2011/047334, 5 pages.

* cited by examiner

RIDE HEIGHT CONTROL SYSTEM AND METHOD FOR CONTROLLING LOAD DISTRIBUTION AT TARGET RIDE HEIGHT IN A VEHICLE SUSPENSION SYSTEM

TECHNICAL FIELD

The present invention relates to vehicle suspension systems and more particularly, to a ride height control system and method for controlling load distribution at target ride height in a vehicle suspension system.

BACKGROUND INFORMATION

Vehicle suspension systems may include ride height control systems for controlling the height of a vehicle relative to a surface on which the vehicle rides. Existing ride height control systems generally operate based on the position of the sprung mass (e.g., the vehicle chassis) relative to the unsprung mass (e.g., the vehicle wheels or axle). A ride height control system may monitor and adjust the position at each wheel location to provide a target ride height. The target ride height may be controlled by the operator manually, for example, by selecting pre-set target ride heights. The target ride height may also be controlled dynamically based on vehicle operating conditions (e.g., speed).

Ride height control may be provided in suspension systems, such as air spring suspension systems, hydropneumatic suspension systems and steel spring systems, in which the ride height is dependent upon the volume of air and/or hydraulic fluid in the system. In hydropneumatic suspension systems, for example, the ride height may be increased by pumping hydraulic fluid (e.g., mineral oil) into the system at each of the wheel locations. The ride height is often controlled by adding or removing air/fluid at each of the wheel locations independently to achieve a target ride height position at that wheel location. In the existing ride height control systems, which control ride height based only on position, the target ride height may be achieved at the wheel locations but in any vehicle with more than three wheels there exist many possible load conditions with the wheels at the correct height. As a result, different pressures in the suspension system at different wheel locations can occur and thus different loads are supported by the suspension system at different wheel locations, unnoticed by the operator. These problems may be compounded in vehicles with a larger number of wheels (e.g., eight wheel vehicles) such as those used by the military.

One problem that occurs in vehicle suspension system with existing ride height control systems is a cross-jacking condition. Under a cross-jacking condition, a load imbalance exists at the wheel locations even though the vehicle may be at the target ride height. When ride height is controlled only based on position, the target ride height may be achieved but with significantly higher loads at some of the wheel locations compared to other wheel locations. The suspension system at the wheel locations at two opposite corners, for example, may be pressurized significantly higher (e.g., 90 psi) than the wheel locations at the other two opposite corners (e.g., 30 psi) while still maintaining the same ride height. In terms of the vehicle load, two of the opposite corner wheel locations may each support 1500 lb. of a 4000 lb. vehicle and the other two opposite corner wheel locations may each support 500 lb. These load imbalances may adversely affect the handling of the vehicle, for example, as a result of different tractions on the tires and/or different suspension response at the different wheel locations.

Another problem may occur in vehicle suspension systems with existing ride height control systems as a result of a wheel displacement condition. Under a wheel displacement condition, one (or some subset) of the wheels of a vehicle may be stopped on a surface irregularity that causes the wheel(s) to be displaced in an upward or downward direction. If the vehicle is stopped with a wheel on a rock or curb, for example, the wheel will be displaced in an upward direction. If the vehicle is stopped with the wheel in a ditch, the wheel will be displaced in a downward direction.

The upward displacement, in particular, will cause compression of the suspension system at that location and the wheel and chassis will have a closer position with a higher pressure and load at that wheel location. Existing ride height control systems that control ride height based only on position will interpret this closer position as requiring an adjustment to raise the ride height at that location in an attempt to maintain the target ride height. The ride height is raised, for example, by adding air or fluid to the suspension system at the upwardly displaced wheel location. The position at the other locations may then be independently adjusted to maintain the target ride height, which may result in different pressures and loads at the different wheel locations. When the vehicle is moved back to a relatively flat surface after these adjustments, the loads may be unbalanced and the ride height may initially need to be readjusted. These load imbalances and ride height adjustments caused by wheel displacement conditions may also adversely affect the vehicle performance and handling.

BRIEF DESCRIPTION OF THE DRAWINGS

These and other features and advantages will be better understood by reading the following detailed description, taken together with the drawings wherein.

DETAILED DESCRIPTION

A ride height control system and method, consistent with embodiments described herein, may be used to control load distribution at wheel locations in a vehicle suspension system at target ride height. Load distribution may be controlled by adjusting the forces applied by the suspension system at respective wheel locations while maintaining a target ride height. In an exemplary air spring suspension system or hydropneumatic suspension system, the applied forces may be adjusted by adjusting the pressure in the suspension system at the respective wheel locations.

In one embodiment, the ride height control system and method may determine and establish balanced target ride height (TRH) forces to be applied at the wheel locations of the vehicle to prevent a cross-jacking condition. The balanced TRH forces may be planar reaction forces having force vectors whose tips collectively best fit a plane.

As used herein, "load" refers generally to the load (or portion of the vehicle load) applied to the suspension system by an unsprung mass at a wheel location of the vehicle. The load may be expressed in the form of a reaction force applied by the suspension system or a pressure (i.e., force per unit area) in the suspension system. As used herein, "force parameter" refers to a force (e.g., N) or some other parameter related to force such as force per unit area or pressure (e.g., psi). As used herein, "ride height" refers to the position of the sprung mass (e.g., the vehicle chassis) relative to the unsprung mass (e.g., the wheel or axle) and "target ride height" refers to the relative position that the suspension system has been commanded to achieve either manually or dynamically. As used herein, "actual position" and "actual force parameter" refer to the relative position and force parameter, respectively, measured under current conditions at a respective wheel location of the vehicle. As used herein, "level condition" refers to a vehicle being located on a relatively flat surface such that the wheels are relatively level with minimal or no wheel displacement from the intended position.

Figure 1:
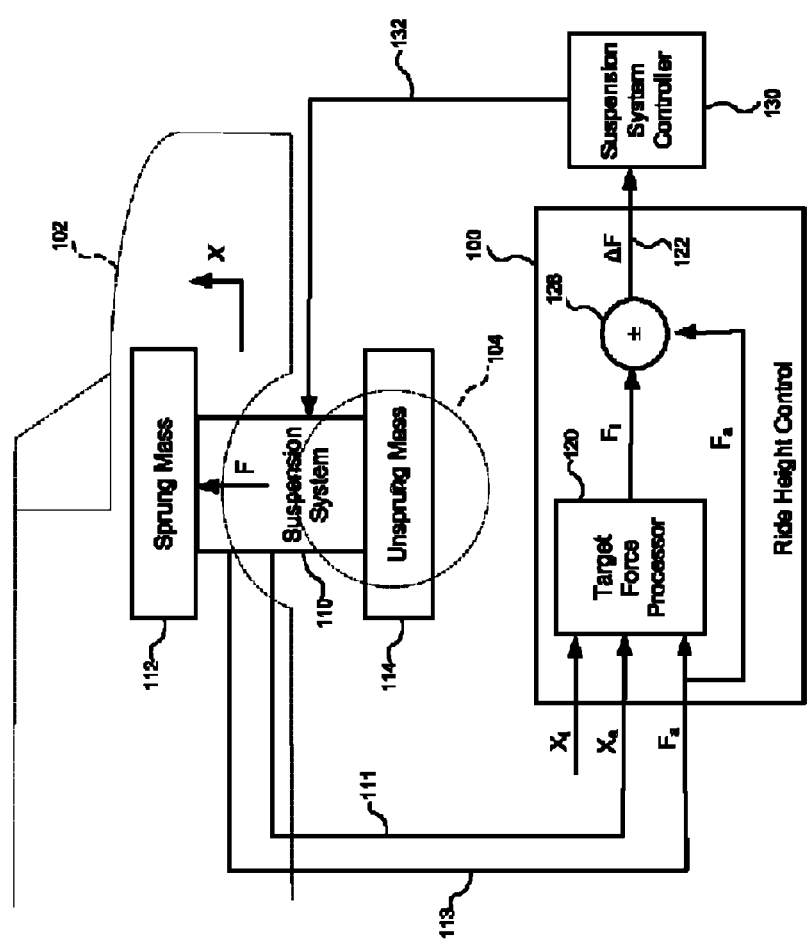
FIG. 1 is a schematic functional block diagram of a ride height control system, consistent with the present disclosure, for controlling load distribution at target ride height in a vehicle suspension system.

Referring to FIG. 1, a ride height control system 100, consistent with embodiments described herein, may be used with a suspension system 110 in a vehicle to control target ride height and target ride height load distribution. The suspension system 110 is located between a suspended or sprung mass 112 (e.g., a vehicle chassis 102) and an unsprung mass (e.g., a vehicle wheel assembly 104) and supports the sprung mass 112 at each wheel location. Only one wheel location is illustrated for purposes of simplification; however, the ride height control system 100 may be used to control the target ride height loads independently at each of the wheel locations in a multi-wheel vehicle. The vehicle may be a conventional four wheel vehicle, such as a car, truck or sport utility vehicle, or may be a vehicle with more than four wheels such as a military vehicle (e.g., with six or eight wheels), a tracked vehicle, or any vehicle with four or more wheels.

As shown, the load supported at each wheel location may be represented as the reaction force F applied by the suspension system 110 to the sprung mass 112 and the ride height may be represented as the relative position X between the sprung mass 112 and the unsprung mass 114. The ride height or relative position X is declared such that it is at a maximum when the sprung mass 112 is farthest from the unsprung mass 114 and decreases as the sprung mass 112 moves closer to the unsprung mass 114. The position X at a wheel location generally decreases as the force F increases because higher loads force the sprung mass 112 and the unsprung mass 114 together and compress the suspension system 110.

The target ride height and the target ride height load distribution may be controlled by changing the relative position X and the reaction force F provided by the suspension system 110 at one or more of the wheel locations. The suspension system 110 may include, for example, a hydropneumatic suspension system or an air spring suspension system in which the target ride height and target ride height load distribution may be controlled, for example, by adding or removing hydraulic fluid or gas to the suspension system 110 at one or more wheel locations. The suspension system 110 may also include a coil spring suspension system.

The suspension system 110 at each wheel location may include sensors for measuring conditions in the suspension system and generating signals proportional to the conditions to provide the variables or parameters used by the ride height control system 100. In particular, the suspension system 110 may include a relative position sensor for generating a signal related to or indicative of the relative position X between the sprung and unsprung masses 112, 114 at the wheel location. The suspension system 110 may also include a force sensor, such as a strain gauge, for directly measuring the load or reaction force F and generating a signal proportional to the load or force at the wheel location. Additionally or alternatively, suspension system 110 may include sensors that measure other parameters related to force such that the actual force may be calculated from those parameters. For example, a pressure sensor may be used to measure a pressure in the suspension system at the wheel location and the actual force or load may be calculated from the measured pressure. The suspension system 110 may also include other sensors for providing other parameters such as accelerometers monitoring acceleration of the sprung mass 112 and/or unsprung mass 114.

The ride height control system 100 generally includes a target force processor 120 that processes data and determines a target ride height (TRH) force parameter $F_t$ related to a target force to be applied by the suspension system 110 at one or more of the wheel locations when the vehicle is at the target ride height. The TRH force parameter $F_t$ may include a force value and/or a pressure value. As will be described in greater detail below, the determination of the TRH force parameter $F_t$ may depend upon a desired load balancing scheme and/or the current wheel displacement condition of the vehicle.

The target force processor 120 may receive data representing the parameters used to determine the target force parameter $F_t$ such as a target ride height $X_t$, an actual position $X_a$ at each wheel location, and an actual force parameter $F_a$ (e.g., measured force or measured pressure) related to the actual force being applied at each wheel location. The actual position and actual force parameter data may be obtained, for example, from sensor signals 111, 113 generated by sensors in the suspension system 110 and representing the measured conditions. The target ride height data may be obtained from stored data or from data provided by another control system. The target force processor 120 may then determine the TRH force parameter $F_t$ for each wheel location based on, at least in part, one or more of these parameters.

The ride height control system 100 may also include an error signal generator 128 for generating an error signal 122 representing a force parameter error or difference $\Delta F$ between the determined TRH force parameter $F_t$ and the actual force parameter $F_a$ for each respective wheel location. A suspension system controller 130 may receive the error signal 122 and provide a suspension system control signal 132 to the suspension system 110 in response to the error signal 122, thereby providing a control loop. Other control systems may also be used to control the suspension system 110 in response to the TRH force parameter $F_t$.

The suspension system control signal 132 may control the suspension system 110, for example, to adjust the force applied at one or more of the wheel locations until the force parameter error is minimized, thereby adjusting the load distribution across all of the wheel locations. Minimizing the force parameter error may include reducing the force parameter error to a minimum value or to below a threshold. If the suspension system 110 is a hydropneumatic suspension system, for example, the forces may be adjusted by adding or removing fluid to or from the dampers at each wheel location of the suspension system. If the suspension system 110 is an air spring system, the forces may be adjusted by increasing or decreasing the air pressure in the air springs at each wheel location of the system. The suspension system controller 130 may provide pump and/or valve control signals to the pump (s) and/or valve(s) that control the supply of fluid or air.

The ride height control system 100 may be implemented as any circuit or circuitry, including an integrated circuit, configured to perform the functions described herein. As used in any embodiment herein, "circuit" and "circuitry" may include, for example, singly or in any combination, hardwired circuitry, programmable circuitry, state machine circuitry, and/or firmware that stores instructions executed by programmable circuitry. "Integrated circuit", as used in any embodiment herein, may include a circuit or circuitry in the form of a semiconductor device and/or microelectronic device, such as, for example, a semiconductor integrated circuit chip. Those skilled in the art will recognize various implementations for the ride height control system 100 including any combination of hardware, software and firmware that is configured or programmed to perform the functions described herein.

In one embodiment, the target force processor 120 determines planar TRH force parameters that provide planar reaction forces at the wheel locations of the vehicle at target ride height and thus a balanced load distribution. The force vectors associated with the planar forces generally fit a best fit plane. As used herein, "best fit plane" refers to the plane which comes closest to the tips of all of the force vectors; "planar forces" refers to a group of reaction forces having force vectors with tips substantially lying in the best fit plane (i.e., without requiring mathematically perfect planarity). The best fit plane may be determined relative to force vectors associated with actual forces being applied to the sprung mass at the wheel locations.

Figure 2A:
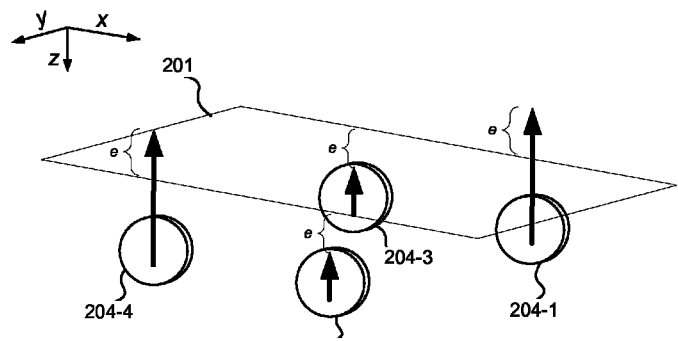
FIG. 2A is a schematic diagram of unbalanced force vectors at wheel locations of a four wheel vehicle under a cross-jacking condition.
Figure 2B:
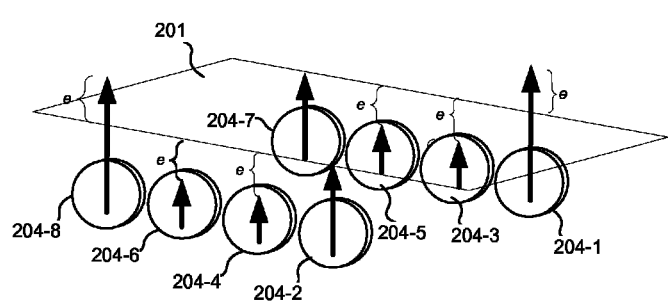
FIG. 2B is a schematic diagram of unbalanced force vectors at wheel locations of an eight wheel vehicle under a cross-jacking condition.
Figure 2C:
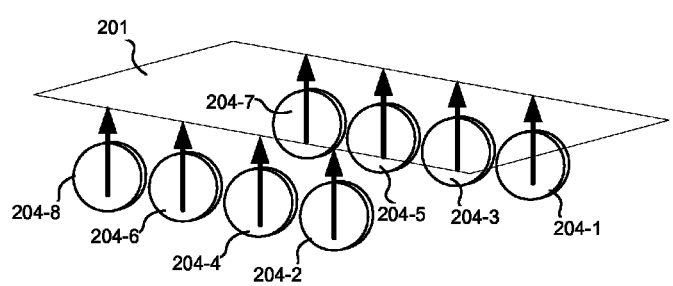
FIG. 2C is a schematic diagram of balanced planar force vectors at wheel locations of an eight wheel vehicle.

FIGS. 2A-2C illustrate reaction forces resulting from loads at each of the wheel locations. The reaction forces are shown as force vectors normal to the ground plane in the position of the centers of pressure of the contact patches of the wheel. FIG. 2A illustrates an example of a cross-jacking condition in a four wheel vehicle at ride height. As shown by the force vectors, the reaction forces at the locations of wheels 204-1, 204-4 are higher than the reaction forces at the locations of wheels 204-2, 204-3. FIG. 2B illustrates another example of a cross-jacking condition in an eight wheel vehicle at ride height. In this example, the loads and reaction forces at the center wheels 204-3 to 204-6 are lower than the loads and reaction forces at the corner wheels 204-1, 204-2, 204-7, 204-8.

If the vehicle is in a level condition on a relatively flat surface and the loads are balanced with no cross-jacking, the tips of the force vectors substantially fall in a best fit plane 201. FIG. 2C shows the example of the eight wheel vehicle with the force vectors fitted to the best fit plane 201. In this example, the best fit plane 201 is the plane that best fits the unbalanced force vectors such that the errors (e) between the force vectors and the plane 201 are minimized. When the best fit plane 201 is determined, the errors (e) represent the force differential needed to achieve the planar forces.

Figure 3:
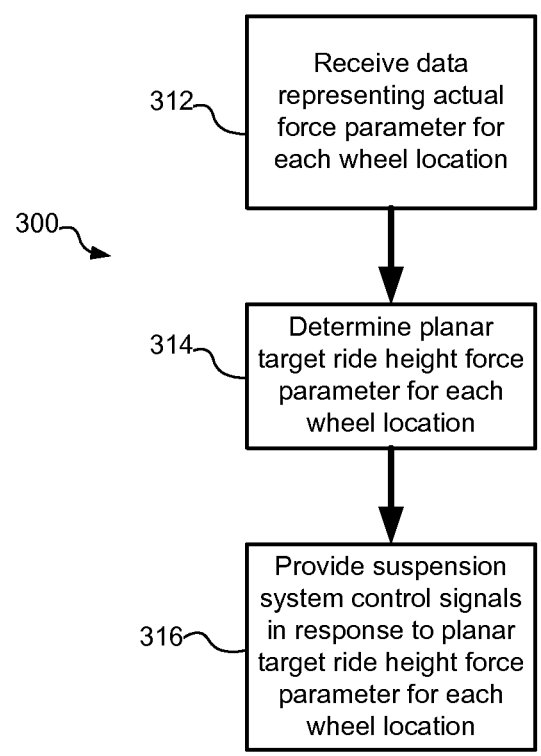
FIG. 3 is a flow chart illustrating one embodiment of a method of controlling a suspension system to provide load balancing.

As illustrated in FIG. 3, one method 300 of controlling a suspension system adjusts the forces applied by the suspension system at the wheel locations such that the associated force vectors are fit to a best fit plane while maintaining the target ride height. This method 300 generally includes receiving 312 data representing actual force parameters (e.g., measured forces or pressures) related to the actual forces applied at the wheel locations. Data representing other parameters used to calculate the actual forces, such as rod area, motion ratio, spring load at full compression, spring rate, and relative position, may also be received.

In an embodiment where the actual force parameter is measured pressure, the actual force $F_{ap}$ from pressure at a respective wheel location may be calculated from the measured pressure $P_a$ as follows:

$$F_{ap}=P_a*A_{rod}/RM \quad (1)$$

where $A_{rod}$ is the area of the supporting rod applying the pressure in the damper of the suspension system and RM represents the motion ratio. The motion ratio may be a linear or non-linear motion ratio known to those skilled in the art and may be a constant or a non-constant.

In an embodiment where the actual force also includes a spring force component, the spring force $F_{aspr}$ may be calculated as a function of the actual position $F(X_a)$. For a linear spring, for example, the spring force $F_{aspr}$ may be calculated as follows:

$$F_{aspr}=F_{s0}-(K_{spr}*X_a) \quad (2)$$

where $F_{s0}$ is the spring load at full compression (N), $K_{spr}$ is the spring rate (N/m) and $X_a$ is the actual position of the sprung mass relative to the unsprung mass. In general, the properties of the spring are known at design time and do not vary substantially over the life of the vehicle. The actual force $F_a$ may then be calculated by adding the damper force component from the pressure and the spring force component as follows:

$$F_a=F_{ap}+F_{aspr} \quad (3)$$

The method 300 further includes determining 314 a planar TRH force parameter (e.g., a target force or target pressure) for each wheel location and providing 316 suspension system control signals to control the forces applied at one or more wheel locations in response to the planar TRH force parameter. The planar TRH force parameter may be determined by determining a best fit plane relative to the tips of the force vectors associated with the actual forces for the wheel locations and by determining the forces having vectors with tips located in that plane, as will be described in greater detail below. The suspension control signals may be provided based on a difference or error between the planar TRH force parameter and the actual force parameter at the wheel locations, for example, using a control loop as discussed above and shown in FIG. 1. In one embodiment, for example, the planar TRH force parameter includes a target pressure, the actual force parameter includes a measured pressure, and the suspension control signals cause the pressure in the suspension system at the respective wheel locations to be adjusted to minimize the difference or error between the target pressure and measured pressure.

One method for determining a best fit plane applies planar equations and a least-squares technique to the known wheel locations and forces. As a frame of reference, the x-axis is directed longitudinally (e.g., forward) of the vehicle, the y-axis is directed laterally (e.g., to the right/starboard side) of the vehicle, and the z-axis is directed downward (e.g., see FIG. 2A). For a vehicle with N axles, there are 2N wheel locations and thus 2N points to be fit to the plane. The general equation of a plane is $Ax+By+Cz=D$ and reformatted to the z-intercept form is $C_x x+C_y y+C_z=z$ where the coefficient $C_z$ represents the z-axis intercept and the coefficients $C_x$ and $C_y$ represent the planar slopes. If all of the points (i.e., tips of the force vectors) lie on a plane, the values of the point locations (i.e., force values) can be inserted into the plane equation without violating the equality. If no single plane passes through all of the points, a geometric plane may be found that is relatively close to all of the points (i.e., the best fit plane). To find the geometric plane that best fits 2N points representing the tips of the force vectors, a system of equations may be constructed as follows:

$$A\bar{c} = \bar{b} \tag{4}$$

where the vector $$\bar{c} = \begin{bmatrix} C_x \\ C_y \\ C_z \end{bmatrix}$$

is the set of plane coefficients and the vector $$\bar{b} = \begin{bmatrix} F_{z-1} \\ F_{z-2} \\ \vdots \\ F_{z-2N} \end{bmatrix}$$

is the set of reaction forces in the Z axis at the respective 2N wheel locations in a vehicle with N axles, and the 2N×3 matrix $$A = \begin{bmatrix} x_1 & y_1 & 1 \\ x_2 & y_2 & 1 \\ \vdots & \vdots & \vdots \\ x_{2N} & y_{2N} & 1 \end{bmatrix}$$

is the collection of x-y wheel location values.

Because the wheel locations and the reaction forces are known, the matrix A and vector $\bar{b}$ are known. The best fit plane is the geometric plane with the minimal amount of differential or error (e) from the set of force vectors (e.g., plane 201 shown in FIGS. 2A-2C). A least squares method may be applied to the system of planar equations to minimize the error as follows:

$$\|\bar{e}\|^2 = \|A\bar{c} - \bar{b}\|^2 \tag{5}$$

The vector $\bar{c}$ of best fit plane coefficients may be determined from the system of planar equations as follows:

$$A\bar{c} = \bar{b}$$

$$A^T A\bar{c} = A^T \bar{b}$$

$$\bar{c} = (A^T A)^{-1} A^T \bar{b} \tag{6}$$

Using the coefficients of the best fit plane, the vector of error values relative to the best fit plane may be determined as follows:

$$\bar{e} = A(A^T A)^{-1} A^T \bar{b} - \bar{b} \tag{7}$$

As mentioned above, the error vector $\bar{e}$ represents the differential between the actual forces and the planar target forces. The planar target force vector $\bar{b} + \bar{e}$ may thus be determined as follows:

$$\bar{b} + \bar{e} = A(A^T A)^{-1} A^T \bar{b} \tag{8}$$

Accordingly, the planar TRH force for the respective wheel locations may be determined by matrix calculations using the actual forces and the known wheel locations. Because the matrix $A(A^T A)^{-1} A^T$ is an invariant property of a vehicle with fixed wheel locations in the x-y axis, it may be computed once, thus simplifying the calculations and reducing the processing requirements. Therefore, the planar TRH force $F_{t-p}$ at the wheel locations 1 to 2N may be determined using the following matrix calculation:

$$F_{t-p} = F_a \times A_{pre} \tag{9}$$

where $F_a$ represents the force vector including the set of actual forces $F_{a-1}$ to $F_{a-2N}$ at the wheel locations and $A_{pre}$ represents the precomputed wheel location matrix $A(A^T A)^{-1} A^T$. The actual forces $F_{a-1}$ to $F_{a-2N}$ at the wheel locations may be used to calculate the planar TRH force $F_{t-p}$ regardless of the wheel displacements at the wheel locations and thus the planar TRH force $F_{t-p}$ is independent of the terrain on which the vehicle is located.

If the actual force parameter measured by the suspension system is pressure, a target pressure associated with the planar TRH force $F_{t-p}$ may be determined from the planar TRH force $F_{t-p}$. The target pressure associated with the planar TRH force $F_{t-p}$ may determined, for example, by removing any spring load contribution at ride height and solving for pressure as follows:

$$P_{t-p} = (F_{t-p} - F_{spr})/A_{rod} \tag{10}$$

where $F_{spr}$ is the spring force at target ride height ($F_{spr} = F(X_t)$) and for a linear spring may be calculated as $F_{spr} = F_{s0} + K_{spr} * X_t$ where $F_{s0}$ is the spring load at full compression (N), $K_{spr}$ is the spring rate (N/m), and $X_t$ is the target ride height. Referring back to FIG. 1, the target force processor 120 in the ride height control system 100 may perform the matrix calculations and the force to pressure conversion calculations described above.

In another embodiment, the error vector $\bar{e}$ may be calculated separately instead of or in addition to calculating the planar target load vector $\bar{b} + \bar{e}$. The error vector $\bar{e}$ may be used to determine the level of out-of-plane in the load vectors, which may be used as a diagnostic indicator, for example, for low tire pressure. In other embodiments, other planar TRH force parameters may be calculated by multiplying the precomputed matrix $A_{pre}$ by a vector including a set of other force parameters.

In other embodiments, the planar equations above may be used to determine the unevenness of a surface on which the vehicle is located. In these embodiments, the vector $\bar{b}$ is the set of measured wheel extension values in the z axis (i.e., the positions $X_{a-1}$ to $X_{a-2N}$ for wheel locations 1 to 2N). The equations may be solved in the same manner discussed above to produce an error vector $\bar{e}$ representing the extent to which the wheels extend out of a plane, thereby corresponding to the "unevenness" of the surface on which the wheels are located. If all of the values of the error vector $\bar{e}$ are zero, the surface is perfectly flat (a possible but unlikely condition). A threshold value may be defined such that a surface is deemed to be flat if all of the values of the error vector $\bar{e}$ are within the threshold or deemed to be uneven if at least one of the values of the error vector $\bar{e}$ exceeds the threshold.

Accordingly, the ride height control system and method, consistent with the embodiments described herein, enables ride height control with proper load distribution in a suspension system under various types of conditions.

Consistent with an embodiment, a method for controlling a suspension system between a sprung mass and an unsprung mass in a vehicle includes: receiving data representing at least one actual force parameter related to a reaction force applied to the sprung mass by the suspension system at each of a plurality of wheel locations of a vehicle; determining a planar TRH force parameter related to a planar TRH force to be applied to the sprung mass at each of the plurality of wheel locations of the vehicle, wherein force vectors associated with the planar TRH force parameter at each of the wheel locations fit a best fit plane relative to force vectors associated with the actual force parameters received for the wheel locations of the vehicle; and providing at least one suspension system control signal to the suspension system in response to the planar TRH force parameter.

Consistent with another embodiment, a ride height control system is provided for use in controlling TRH forces in a vehicle suspension system. The ride height control system includes a target force processor configured to receive data representing at least one actual force parameter related to a reaction force applied to the sprung mass by the suspension system at each of a plurality of wheel locations of a vehicle. The target force processor is also configured to determine a planar TRH force parameter related to a planar TRH force to be applied to the sprung mass at each of the plurality of wheel locations of the vehicle. Force vectors associated with the planar TRH force parameter at each of the wheel locations fit a best fit plane relative to force vectors associated with the actual force parameters received for the wheel locations of the vehicle.

Consistent with a further embodiment, a controlled vehicle suspension includes a suspension system component between a sprung mass and an unsprung mass at each of a plurality of wheel locations and a ride height control system configured to receive data representing at least one actual force parameter related to a reaction force applied to the sprung mass by the suspension system at each of a plurality of wheel locations of a vehicle. The ride height control system is configured to determine a planar TRH force parameter related to a planar TRH force to be applied to the sprung mass at each of the plurality of wheel locations of the vehicle. Force vectors associated with the planar TRH force parameter at each of the wheel locations fit a best fit plane relative to force vectors associated with the actual force parameters received for the wheel locations of the vehicle. The ride height control system is configured to generate an error signal representing a force parameter error at each of the wheel locations. The force parameter error represents a difference between the actual force parameter obtained for a respective one of the wheel locations and the planar TRH force parameter. The controlled vehicle suspension further includes a suspension control system configured to provide at least one suspension system control signal to the suspension system in response to the error signal determined for each of the wheel locations.

While the principles of the invention have been described herein, it is to be understood by those skilled in the art that this description is made only by way of example and not as a limitation as to the scope of the invention. The term "exemplary" is used herein to refer to merely an example and does not necessarily refer to a preferred or meritorious example. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method of controlling a suspension system between a sprung mass and an unsprung mass in a vehicle, the method comprising:
   receiving data representing at least one actual force parameter related to a reaction force applied to the sprung mass by the suspension system at each of a plurality of wheel locations of a vehicle;
   determining a planar target ride height (TRH) force parameter related to a planar TRH force to be applied to the sprung mass at each of the plurality of wheel locations of the vehicle, wherein force vectors associated with the planar TRH force parameter at each of the wheel locations fit a best fit plane relative to force vectors associated with the actual force parameters received for the wheel locations of the vehicle, wherein the planar TRH force parameter is determined, at least in part, based on a planar best fit calculation; and
   providing at least one suspension system control signal to the suspension system in response to the planar TRH force parameter.

2. The method of claim 1 wherein receiving the data representing actual force parameters comprises:
   receiving pressures measured in the suspension system at the wheel locations; and
   calculating actual reaction forces from the pressures measured at the wheel locations.

3. The method of claim 1 wherein providing the at least one suspension system control signal in response to the planar TRH force parameter comprises;
   determining a force parameter error at each of the wheel locations, the force parameter error representing a difference between the actual force parameter obtained for a respective one of the wheel locations and the planar TRH force parameter determined for the respective one of the wheel locations; and
   providing the suspension system control signal to change the actual forces at the wheel location until the force parameter error is minimized.

4. The method of claim 3 wherein the actual forces are changed by adding or removing fluid to or from the suspension system to change pressure in the suspension system at the wheel locations.

5. The method of claim 3 wherein the actual force parameter includes an actual pressure measured in the suspension system at each of the wheel locations, and wherein the planar TRH force parameter includes a target pressure determined for the suspension system at each of the wheel locations.

6. The method of claim 3 wherein the force parameter error is a difference between an actual pressure measured in the suspension system at a respective one of the wheel locations and a target pressure calculated from the planar TRH force parameter determined for each of the wheel locations.

7. The method of claim 1 wherein the planar TRH force parameter is determined, at least in part, on a least-squares planar best fit calculation.

8. The method of claim 1 wherein determining the planar TRH force comprises:
   obtaining a pre-computed x-y wheel location matrix, the pre-computed x-y wheel location matrix being based on fixed wheel locations in x and y directions, the x direction being directed longitudinally of the vehicle and the y direction being directed laterally of the vehicle; and
   calculating the planar TRH force parameter based, at least in part, on the pre-computed x-y wheel location matrix and the actual force parameters for the wheel locations.

9. The method of claim 8 wherein the actual force parameter includes an actual pressure measured in the suspension system at each of the wheel locations, and wherein calculating the planar TRH force parameter comprises:
   calculating an actual force for each of the wheel locations from the actual pressure measured, respectively, for each of the wheel locations; and
   performing a matrix multiplication of the pre-computed s-y wheel location matrix and a vector including a set of actual forces calculated for the wheel locations.

10. A ride height control system for use in controlling TRH forces in a vehicle suspension system, the ride height control system comprising:

a target force processor configured to receive data representing at least one actual force parameter related to a reaction force applied to the sprung mass by the suspension system at each of a plurality of wheel locations of a vehicle, and wherein the target force processor is configured to determine a planar TRH force parameter related to a planar TRH force to be applied to the sprung mass at each of the wheel locations of the vehicle, wherein force vectors associated with the planar TRH force parameter at each of the wheel locations fit a best fit plane relative to force vectors associated with the actual force parameters received for the wheel locations of the vehicle.

11. The ride height control system of claim 10 further comprising an error signal generator configured to generate an error signal representing a force parameter error at each of the wheel locations, the force parameter error representing a difference between the actual force parameter obtained for a respective one of the wheel locations and the planar TRH force parameter determined for the respective one of the wheel locations.

12. The ride height control system of claim 10 wherein the actual force parameter is a measured pressure.

13. The ride height control system of claim 10 wherein the planar TRH force parameter is determined, at least in part, based on a least-squares planar best fit calculation.

14. The ride height control system of claim 10 wherein the planar TRH force parameter is calculated based on, at least in part, the actual force parameters for the wheel locations and a pre-computed x-y wheel location matrix, the pre-computed x-y wheel location matrix being based on fixed wheel locations in x and y directions, the x direction being directed longitudinally of the vehicle and the y direction being directed laterally of the vehicle.

15. A controlled vehicle suspension comprising:

a suspension system component between a sprung mass and an unsprung mass at each of a plurality of wheel locations;

a ride height control system configured to receive data representing at least one actual force parameter related to a reaction force applied to the sprung mass by the suspension system at each of a plurality of wheel locations of a vehicle, wherein the ride height control system is configured to determine a planar TRH force parameter related to a planar TRH force to be applied to the sprung mass at each of the plurality of wheel locations of the vehicle, wherein force vectors associated with the planar TRH force parameter at each of the wheel locations fit a best fit plane relative to force vectors associated with the actual force parameters received for the wheel locations of the vehicle, and wherein the ride height control system is configured to generate an error signal representing a force parameter error at each of the wheel locations, the force parameter error representing a difference between the actual force parameter obtained for a respective one of the wheel locations and the planar TRH force parameter; and a suspension control system configured to provide at least one suspension system control signal to the suspension system in response to the error signal determined for each of the wheel locations.

16. The controlled vehicle suspension system of claim 15 wherein the suspension system component includes a hydropneumatic spring and damper system between the unsprung and sprung masses at each of the wheel locations.

17. The controlled vehicle suspension of claim 15 wherein the actual force parameter is a measured pressure.

18. The controlled vehicle suspension of claim 15 wherein the planar TRH force parameter is determined, at least in part, based on a least-squares planar best fit calculation.

19. The controlled vehicle suspension of claim 15 wherein the planar TRH force parameter is calculated based on, at least in part, the actual force parameters for the wheel locations and a pre-computed x-y wheel location matrix, the pre-computed x-y wheel location matrix being based on fixed wheel location in x and y directions, the x direction being directed longitudinally of the vehicle and the y direction being directed laterally of the vehicle.

* * * * *

UNITED STATES PATENT AND TRADEMARK OFFICE
CERTIFICATE OF CORRECTION

| | | |
|---|---|---|
| PATENT NO. | : 8,437,911 B2 | Page 1 of 1 |
| APPLICATION NO. | : 12/858226 | |
| DATED | : May 7, 2013 | |
| INVENTOR(S) | : Edward Lanzilotta et al. | |

It is certified that error appears in the above-identified patent and that said Letters Patent is hereby corrected as shown below:

On the Title Page

In column 2 on page 2 under Other Publications, line 2, Delete "U5" and insert -- US --, therefor.

In the Claims

In column 10, line 28, in Claim 3, delete "location" and insert -- locations --, therefor.

In column 10, line 66, in Claim 9, delete "s-y" and insert -- x-y --, therefor.

In column 11, line 11, in Claim 10, after "of the" insert -- plurality of --.

Signed and Sealed this
Third Day of September, 2013

Teresa Stanek Rea
*Acting Director of the United States Patent and Trademark Office*